Nov. 24, 1970

C. R. FOGG 3,541,664

PISTON RING COMPRESSOR

Filed May 9, 1968

INVENTOR.
CHARLES R. FOGG
BY
Lynn H. Latta
—ATTORNEY—

United States Patent Office 3,541,664
Patented Nov. 24, 1970

3,541,664
PISTON RING COMPRESSOR
Charles R. Fogg, 3742 W. 119th St. Place,
Hawthorne, Calif. 90250
Filed May 9, 1968, Ser. No. 727,956
Int. Cl. B23p *19/08*
U.S. Cl. 29—222    3 Claims

ABSTRACT OF THE DISCLOSURE

A sectional sleeve, with open sections of varying circumference replaceably attachable to a control section, and with means for contracting and locking the sleeve at the diameter of a piston to be inserted in a cylinder, and with internal ramp flutes to contract the piston rings for entry into the cylinder as the piston is pushed through the sleeve.

BACKGROUND OF THE INVENTION

The conventional means for compressing piston rings is a band clamp which is tightened around the rings to hold them sufficiently contracted to enter the cylinder while the piston is being inserted. Considerable skill is required in order to successfully use such devices and at best the operation in which they are utilized is an awkward and slow one.

SUMMARY OF THE INVENTION

The invention provides for replacement of one sleeve section by another of larger or smaller circumference so as to adapt the compressor to several different ranges of piston diameters. A control section has a stud and keyhole slot connection to one end of the replaceable sleeve section, and a combination pin and aperture, locking tongue and slot connection to the other end, releaseable by contracting the sleeve to minimum diameter. The sleeve has integral ramp flutes for contracting the rings, and a floating, circumferentially adjustable flute at the adjustable overlap area of the sleeve.

OBJECTS OF THE INVENTION

The invention embraces the following objects:
(1) To simplify and facilitate the installation operation;
(2) To speed up the installation operation;
(3) To eliminate the need for the acquisition of skill by the workman in performing the operation;
(4) To utilize the piston as a sizing gage and as a pilot to accurately locate the tool in concentric relation to the cylinder so that the tool in turn may accurately position the rings in concentric positions as they are being compressed;
(5) To utilize installation of the piston skirt-first in order to attain the piloting action referred to above.

The invention further aims to provide a tool which:
(1) Is simple and inexpensive in construction;
(2) Is durable and rugged;
(3) Can be quickly applied to a piston;
(4) Embodies means for contracting the piston rings in response to axial movement of the piston as it is inserted into a cylinder;
(5) Will accurately guide the piston ring concentrically into the cylinder without catching against the mouth of the cylinder;
(6) Utilizes its encircling engagement with the skirt to the piston in order to effect such concentric positioning of the rings;
(7) Is adjustable to pistons in a range of sizes;
(8) Is adapted to be quickly sized to the correct diameter for the pistons being installed, and to be locked to that diameter;
(9) Is sized simply by closing it around the skirt or head of a piston and locking it in such closed position;
(10) Can be used for installing a set of pistons without resizing after it is sized to the first piston of the set;
(11) Is convertible from one range of sizes to a larger or smaller range.

Figure 5:
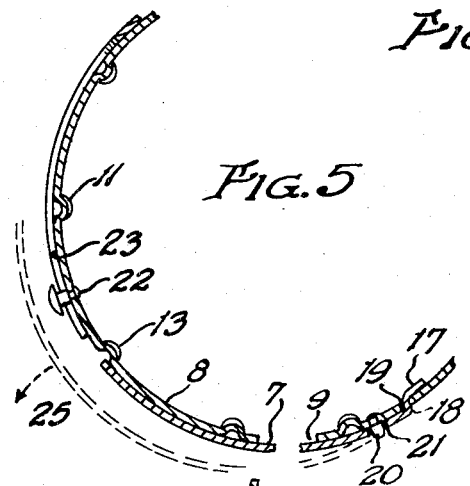
Figure 6:
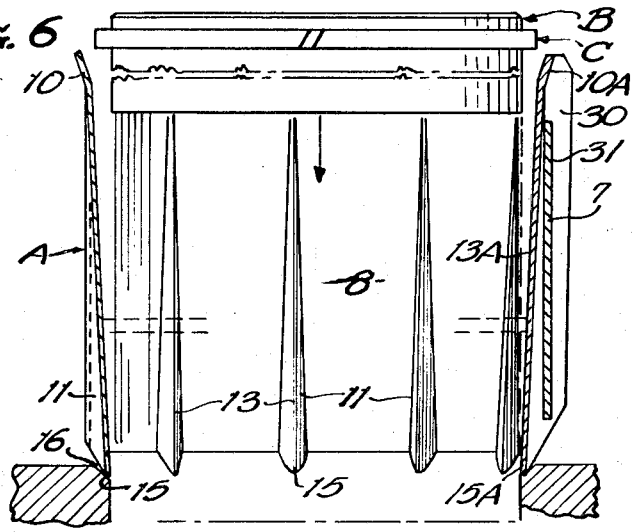
Figure 3:
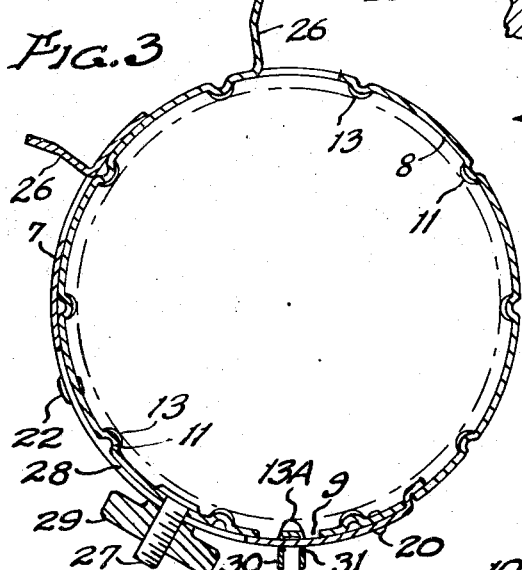
Figure 4:
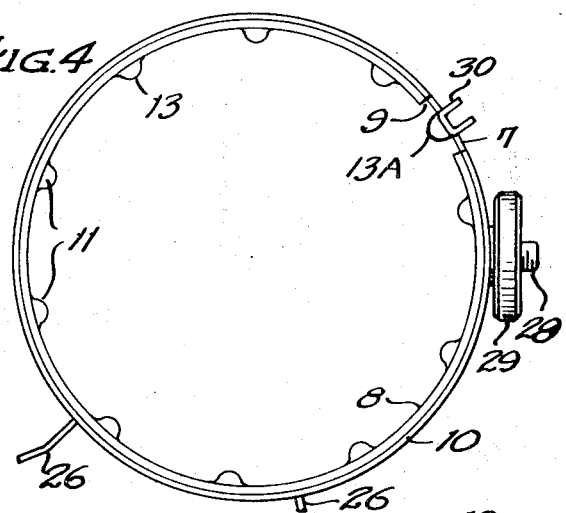
Figure 1:
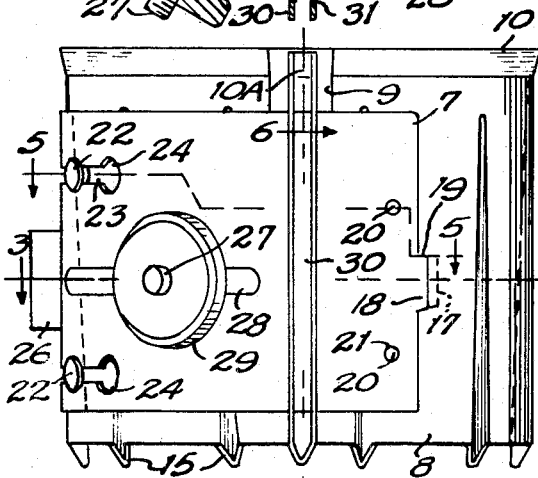
Figure 2:
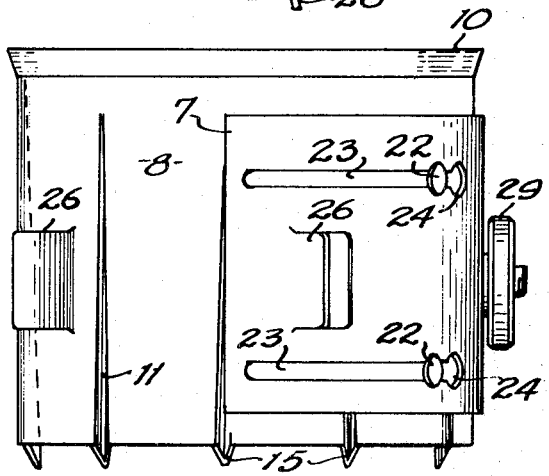
Figure 7:
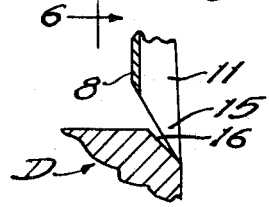

In the drawings:
FIG. 1 is a front elevational view of a compressor embodying the invention;
FIG. 2 is a side elevational view thereof;
FIG. 3 is a transverse sectional view thereof, taken on line 3—3 of FIG. 1;
FIG. 4 is a top plan view of the same;
FIG. 5 is a fragmentary cross-sectional view taken on line 5—5 of FIG. 1;
FIG. 6 is a vertical sectional view taken on line 6—6 of FIG. 1;
FIG. 7 is an enlarged, detail sectional view of the piloting means.

DESCRIPTION

Referring now to the drawings in detail and in particular to FIG. 6 thereof, I have shown therein, as an example of one form in which the invention may be embodied, a ring compressor tool A and method of installation wherein a piston B with rings C installed thereon, is inserted skirt-first into a cylinder D of an internal combustion engine.

The skirt-first operation is utilized in open installations (on engines in which pistons are installed from the top of the cylinder block). Where a "closed" installation is involved, as in a Volkswagen, the pistons are installed head-first from the bottom of the block, the compressor being then used in an inverted position. The compressor A is first applied to the piston B in encircling relation to its skirt, then contracted by adjustment into snug engagement with the skirt but free of engagement with the rings C. The skirt of the piston is then inserted into the cylinder D, thus locating the tool A in concentric relation to the cylinder D. The piston is then moved axially into the cylinder D as indicated by the arrow in FIG. 6, and as the rings C are moved through the tool A, they are automatically compressed and located so as to smoothly enter the cylinder without catching against the open end thereof.

In the conventional method of installing pistons, a compressor band is first tightened around the set of rings on a piston, the piston skirt is then inserted into the cylinder, the piston is driven out of the compressor and into the cylinder (the common method being to strike the head of the piston with the end of the handle of a ball-peen hammer), and the compressor band is then opened up and installed on the next piston and then again tightened to compress the rings. This cycle of operations is repeated for each of the several pistons of the engine being overhauled. It frequently occurs that a particular ring is not compressed sufficiently to enter the cylinder, and in that event, the pounding action usually breaks the ring and sometimes scores the cylinder wall. An essential aspect of this conventional procedure is the precompressing of each group of rings on a respective piston and the subsequent opening of the compressor for installation on the next piston, which procedure must be repeated for each piston. Also, it has been found necessary to pound the pistons through the compressor as described above.

In contrast to this procedure, in the present invention the rings are not precompressed but are automatically compressed as a result of pushing the piston through the compressor into the cylinder. The compressor is initially sized upon the skirt of the first piston and I find that this sizing is sufficiently accurate for all of the remaining pistons so that no further sizing adjustment need be made on the tool for the remaining pistons of the engine being overhauled. Furthermore, in the practice of my invention, the pistons are inserted by finger pressure alone, the constricting engagement of the compressor around the piston skirt being adjusted so as to grip the piston with a gentle embrace which is not sufficiently tight to prevent the piston being pushed through the compressor by finger pressure. Thus, if a particular ring should have insufficient gap or be obstructed by dirt, chips or carbon in the ring groove in which it is contained, such that it cannot be constricted to a diameter such as to freely enter the cylinder, the resultant high resistance to compression will be sensed by the operator, who will then withdraw the piston, clean its ring grooves or substitute another ring and proceed with the installation before any damage has occurred.

The compressor A comprises, in general, a resilient band composed of a control section 7 consisting generally of a cylindrically arcuate plate of stamped sheet metal; and a replaceable transport sleeve 8 in the for of a split cylinder having a gap 9 bridged by the control section 7. Both sections of the band are of spring sheet metal, preferably steel, with adequate resiliency for contraction and expansion throughout a ½" range of piston diameters (e.g. from 3½" to 4") in response to the grip of a workman's fingers.

Transport sleeve 8 has a flaring, frusto-conical rim 10 to receive and guide the lower end of a piston skirt into the compressor band after it has been sized to a piston of the same diameter, and locked. It is formed with a plurality of integral ramp flutes 11 of channel section and of dart shape, pressed into the cylindrical wall of the sleeve. Flutes 11 have inner ramp edges 13 which are inclined inwardly and downwardly from their pointed ends in a conically converging array. Their height (of radially inward projection) increases gradually from zero at their pointed ends to maximum at their wider ends.

Sizing of the compressor to a set of pistons is effected by inserting the first piston into the compressor with the higher ends of flutes 11 engaged against the smooth cylindrical wall of the piston skirt (or head) and then locking the compressor at the diameter thus determined. Thus, by resting the lower end of compressor A on the engine block D over a cylinder thereof, and pushing the piston B downwardly through the compressor, the rings D will be closed to the diameter of the piston and will freely enter the cylinder, already entered by the piston skirt, and the piston, with the rings closed thereon, can be pushed on through the compressor and into the cylinder. The ramp edges 13 are of rounded cross-section so as to provide smooth, non-biting bearing surfaces on which the rings may slide, yet the area of contact of the rings with the ramp edges is of limited width (substantially line-contact) and frictional resistance to ring-closing sliding movement is thereby radically minimized. Thus it is possible to pass a piston through the compressor into the cylinder D merely by pressing the thumbs downwardly against the top of the piston.

At their lower ends, ramp flutes 11 are extended below the lower end margin of transport sleeve 8 to provide fingers 15 adapted to be received in the chamfer 16 conventionally provided at the upper end of an engine cylinder, so a to provide a piloting action which guides the compressor downwardly with a centering action until the fingers 15 rest solidly upon the cylinder block (e.g. chamfer 16—FIG. 7). Thus the invention provides instant automatic positioning of the compressor in coaxial communication with the cylinder D and maintains the alignment of compressor and cylinder as pressure is applied to the piston to force it through the compressor. Fingers 15 also may function by wedging action in chammer 16 to resist the tendency of the compressor to expand under the radial pressure applied to ramp edges 13 by the rings C as they are compressed, and to prevent compressor from slipping out of the chamfer in the event the applied pressure should be uneven, such as to tend to tilt the compressor. It may be noted, at this point that since the compressor is sized so that only the tips of fingers 15 are sized to the piston diameter, while the lower areas of ramp edges 13 and the inner wall of transport sleeve 8 are at a larger diameter, expanding pressure against the compressor will be minimal until the piston has passed nearly through the compressor, and the sized diameter of the tips of fingers 15 will be effectively maintained so as to avoid expansion such as might result in a ring becoming caught against the cylinder mouth. In this respect the invention provides a distinct improvement in operation over the conventional compressor band which is sized by drawing it snugly around the rings and the grooved area of the piston until its full internal area is engaged against the piston wall, and which tends to open up at its end where the piston leaves it to enter the engine cylinder, and to allow one or more of the rings to expand sufficiently to hang up against the mouth of the cylinder.

Furthermore, with only the pointed tips of fingers 15 engaged in the mouth of the cylinder, if the compressor should be tilted slightly out of true coaxial alignment with the cylinder, no difficulty in passing a piston through the compressor into the cylinder will be experienced, since the inclinations of the ramp edges 13 will automatically adjust the piston-transfer alignment (by permitting a compensating tilting of the piston within the compressor) up to the limit of 3½°, which is the angle of ramp inclination.

Control section 7 is connected at one end to one of the free ends of transport sleeve 8 by means of a tongue 17 having a Z-offset web 18 integrally joined to the margin of that end of the control section, and receivable in a slot 19 in said one free end of the sleeve 8, the tongue 17 being offset inwardly to an extent equal to or slightly more than the wall thickness of sleeve 8 so as to abut the inner face of the sleeve to lock the end of control section 7 in engagement with the outer face of sleeve 8, while a pair of pins 20 anchored in sleeve 8 and engaged in aperatures 21 in control section 7, securely couple the two sections together to adequately withstand the hoop tension developed in the compressor by the compression of the rings C.

The other end of control section 7 has a slidable connection with sleeve 8, provided by a pair of headed studs 22 anchored in sleeve 8 and slidably received in parallel slots 23 in the control section. At their ends remote from this end of the. control section, the slots 23 are widened to provide aperatures 24 through which the stud heads can be released when the compressor is contracted to its minimum diameter. Pursuant to such release, the control section can be hinged outwardly from sleeve 8 as indicated at 25 in FIG. 5, until it reaches a substantially radially-projecting position, whereupon the tongue 17 can be withdrawn from slot 19 and the control section then attached to an alternate transport sleeve of greater or lesser circumferential extent so as to adapt the compressor to a different range of piston diameters.

Finger-grip tabs 26, struck out from the sections 7 and 8 of the band respectively, may be engaged between the fingers of the workman to draw the band snugly around the piston. A threaded stud 27, mounted in the sleeve 8, is extended through a circumferentially elongated slot 28 in the control section 7, and is provided with a suitable nut 29 for tightening the band section 7 and 8 into frictional locking engagement with one another after the throat 12 of the band has been adjusted to a properly constructed position around the skirt of a piston. For exchanging control sleeves, the nut 29 is removed from stud 27.

As the compressor band is enlarged from minimum to maximum circumference, the gap 9 will be widened until the ramp flutes 11 on respective sides thereof will be spaced apart by a gap into which the adjacent sides of rings C could project slightly. To avoid the possibility of the rings catching against the cylinder mouth at this point, the invention provides a floating ramp bar 30 of channel section having, in its side flanges, slots 31 through which the control section 7 is extended, whereby the ramp bar 30 is mounted on the control section. Ramp bar 30 has an inclined ramp surface 13A and a pilot finger 15A corresponding to such parts on integral ramp flutes 11, and an upper end shoulder 10A having a slope matching that of rim 10 of sleeve 8. Ramp bar 30 is adapted to be slidably adjusted on control section 7 to a position in the middle of gap 9, and to cooperate with ramps 11 in applying compression to rings C at fairly uniformly-spaced intervals around their circumference.

The operation of compressor A will be apparent from the foregoing description.

Due to the sectional construction of the compressor, which allows the control section 7 to be completely removed, leaving the gap 9 open to its maximum width (considerably wider than shown in FIG. 1) my compressor is easily adapted for use in "closed" installations, the gap 9 providing for passing the sleeve 8 over the piston's connecting rod, which would obstruct the use of a conventional one-piece split-band type of compressor.

I claim:

1. A piston and ring assembly installation compressor comprising: a split compressor band having means for coupling its ends together with the band sized to a piston; and a plurality of ring-contracting ramps carried by said band and projecting inwardly from the inward wall thereof, said ramps having inclined longitudinal ramp edges projecting inwardly and converging in conical array toward an end of the compressor which is adapted to be supported by abutting contact with the end of the cylinder, said ramp edges having, adjacent said compressor end, inward extremities positioned to communicate with said cylinder when said band is thus supported; said ramps being in the form of dart-shaped flutes of channel section of gradually varying width and depth, formed integrally in the wall of said sleeve section.

2. A piston and ring assembly installation compressor comprising: a split compressor band having means for coupling its end together with the band sized to a piston; and a plurality of ring-contracting ramps carried by said band and projecting inwardly from the inward wall thereof, said ramps having inclined longitudinal ramp edges projecting inwardly and converging in conical array toward an end of the compressor which is adapted to be supported by abutting contact with the end of the cylinder, said ramp edges having, adjacent said compressor end, inward extremities positioned to communicate with said cylinder when said band is thus supported; said band comprising a control section and a split sleeve section of substantially a full circumference in arcuate extent having free ends defining a gap adapted to be widened from minimum to a selected maximum width for sizing the band to pistons in a range of sizes, one end portion of said control section overlapping the outer surface of one free end portion of said sleeve section, said ramps being integral, projecting portions of said sleeve section; one of said band sections having in its other end a slot parallel to the sleeve axis, the other band section having in its other end a tongue joined to said other end by a z-offset receivable in said slot; means for locking said overlapping end portions of the band to one another in a selected sized diameter of said band; and means providing a slidable connection between said one end portion of said control section and said one free end portion of said sleeve section, said last means comprising headed studs anchored in said sleeve section and parallel circumferential slots in said control section, said slots having their ends nearest said tongue enlarged to provide apertures through which said headed studs are releasable when the band is contracted to a minimum circumference.

3. A tool as defined in claim 1, wherein said ramps are in the form of dart-shaped flutes of channel section of gradually varying width and depth, formed integrally in the wall of said sleeve section.

References Cited

UNITED STATES PATENTS

| 1,544,974 | 7/1925 | Gillis | 29—222 |
| 1,593,220 | 7/1926 | Phelps | 29—222 |
| 2,553,663 | 5/1951 | Martin | 29—222 |

FOREIGN PATENTS

| 415,296 | 8/1934 | Great Britain. |
| 473,899 | 5/1951 | Canada. |

ROBERT C. RIORDON, Primary Examiner

J. C. PETERS, Assistant Examiner